United States Patent
Lacoss-Arnold

(10) Patent No.: US 10,402,819 B2
(45) Date of Patent: Sep. 3, 2019

(54) SYSTEMS AND METHODS FOR USE IN INHIBITING THEFT OF PAYMENT CARDS

(71) Applicant: MASTERCARD INTERNATIONAL INCORPORATED, Purchase, NY (US)

(72) Inventor: Jason Lacoss-Arnold, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 407 days.

(21) Appl. No.: 14/317,140

(22) Filed: Jun. 27, 2014

(65) Prior Publication Data

US 2015/0302410 A1 Oct. 22, 2015

Related U.S. Application Data

(60) Provisional application No. 61/982,668, filed on Apr. 22, 2014.

(51) Int. Cl.
*G06Q 20/10* (2012.01)
*G06Q 20/34* (2012.01)

(52) U.S. Cl.
CPC ................................. *G06Q 20/354* (2013.01)

(58) Field of Classification Search
CPC .... G06Q 20/354; G06Q 20/10; G06Q 20/102; G06Q 20/40; G06Q 30/04; G06Q 30/06; G06Q 40/00; G06Q 40/02
USPC ..................................................... 705/35–44
See application file for complete search history.

(56) References Cited

U.S. PATENT DOCUMENTS

| | | | | |
|---|---|---|---|---|
| 6,298,336 B1 * | 10/2001 | Davis | .................. | G06Q 20/105 705/41 |
| 6,829,596 B1 * | 12/2004 | Frazee | .............. | G06Q 20/0457 235/380 |
| 7,252,226 B2 * | 8/2007 | Risafi | .................... | G07F 7/1008 235/381 |

(Continued)

OTHER PUBLICATIONS

IQ tests for smart cards; Morrall, Katherine; Bank Marketing v29n3 pp. 18-25, Mar. 1997.*

(Continued)

*Primary Examiner* — Hani M Kazimi
(74) *Attorney, Agent, or Firm* — Harness, Dickey & Pierce, P.L.C.

(57) ABSTRACT

Exemplary systems and methods for inhibiting payment card theft are disclosed. One exemplary method includes receiving a non-activation attempt for a payment card. The payment card has a primary account number (PAN). The non-activation attempt includes the PAN. When the non-activation attempt precedes an activation attempt for the payment card, the exemplary method includes appending the payment card to a do-not-activate list stored in memory. The exemplary method further includes receiving the activation attempt from the merchant, via a payment network. The activation attempt includes an identifier associated with the payment card. The identifier is different than the PAN. And, in response to an activation attempt, the method includes declining activation of the payment card when the payment card is included in the do-not-activate list.

20 Claims, 4 Drawing Sheets

(56) References Cited

U.S. PATENT DOCUMENTS

| | | | | |
|---|---|---|---|---|
| 7,930,411 | B1* | 4/2011 | Hayward | G06F 21/41 |
| | | | | 709/229 |
| 7,965,827 | B2* | 6/2011 | Myers | G06Q 30/00 |
| | | | | 379/114.2 |
| 7,979,351 | B1* | 7/2011 | Vollmer | G06Q 20/10 |
| | | | | 705/1.1 |
| 7,980,462 | B1* | 7/2011 | Graef | G06Q 20/1085 |
| | | | | 235/379 |
| 8,939,354 | B1* | 1/2015 | Hinson | G06F 21/86 |
| | | | | 235/375 |
| 2006/0136595 | A1* | 6/2006 | Satyavolu | G06F 21/41 |
| | | | | 709/229 |
| 2009/0106846 | A1* | 4/2009 | Dupray | G06Q 40/02 |
| | | | | 726/26 |
| 2011/0165866 | A1* | 7/2011 | Dixon | G06Q 10/08 |
| | | | | 455/414.1 |

OTHER PUBLICATIONS

The expanding world of the smart card; Schlumberger 1996 Annual Report: Smart card, 1996.*

\* cited by examiner

US 10,402,819 B2

SYSTEMS AND METHODS FOR USE IN INHIBITING THEFT OF PAYMENT CARDS

CROSS-REFERENCE TO RELATED APPLICATION

This application claims the benefit of U.S. Provisional Application No. 61/982,668 filed on Apr. 22, 2014. The entire disclosure of the above application is incorporated herein by reference.

FIELD

The present disclosure relates to systems and methods for use in inhibiting theft of payment cards, by monitoring non-activation attempts to inactive payment cards.

BACKGROUND

This section provides background information related to the present disclosure which is not necessarily prior art.

Gift cards and prepaid cards are known for use in purchasing goods and services. Gift cards and prepaid cards are identified by a particular number, such as an account number, but (unlike credit cards and debit cards) are often not identified to a particular person and can be used by anyone. As such, gift cards and prepaid cards can be sold through merchants to any number of purchasers, who often intend the cards to be transferred to another person, such as, for example, as a gift, giveaway, repayment, etc.

DRAWINGS

The drawings described herein are for illustrative purposes only of selected embodiments and not all possible implementations, and are not intended to limit the scope of the present disclosure.

DETAILED DESCRIPTION

Exemplary embodiments will now be described more fully with reference to the accompanying drawings.

Where payment cards are offered for sale by a merchant, the payment cards are often inactive prior to purchase. Further, the payment cards may be enclosed in packaging, which obscures at least part of the payment card, and frequently, the entire payment card. The packaging of a payment card may then include an identifier associated with the payment card, which may be used by the merchant (and the payment network) to activate the card. In some instances of fraud, a thief may access the packaging, exchange the payment card for a "dummy" card (generally, an expired or worthless card of the same form factor, etc.), and replace the packaging (with the different card) on the shelf at the merchant, such that the packaging appears to be in its original condition. Alternatively, the thief may somehow obtain the account number of the payment card (e.g., write down or otherwise record the account number, etc.), but leave the card in the package, such that the package appears to be in its original condition. The thief may then attempt to use the card, or otherwise confirm the card has been activated, so that he/she may access the funds associated with the card.

In the meantime, a consumer may purchase the "payment card," and at checkout or later, unwittingly activate the payment card for the thief. In particular, the payment card is activated, for example, by the merchant scanning or otherwise reading an identifier on the packaging (rather than any indicia on the payment card itself), and transmitting the identifier through the payment network or directly to an issuer. Systems and methods are described herein for use in inhibiting the theft of payment cards in this manner. More specifically, after a thief has swapped the payment card for a dummy card (or obtained the account number of the payment card), the thief may attempt one or more "non-activation" uses with the payment card (e.g., purchase a commodity, check a balance, etc.) to determine the payment card is active. When such non-activation attempts occur prior to activation of the payment card, it is an indication of theft. The systems and methods herein detect this condition and append the payment card to a do-not-activate list. When a consumer later seeks to activate the payment card at the merchant, for example, the issuer of the payment card checks the do-not-activate list and declines activation of payment cards included in that list.

Figure 1:
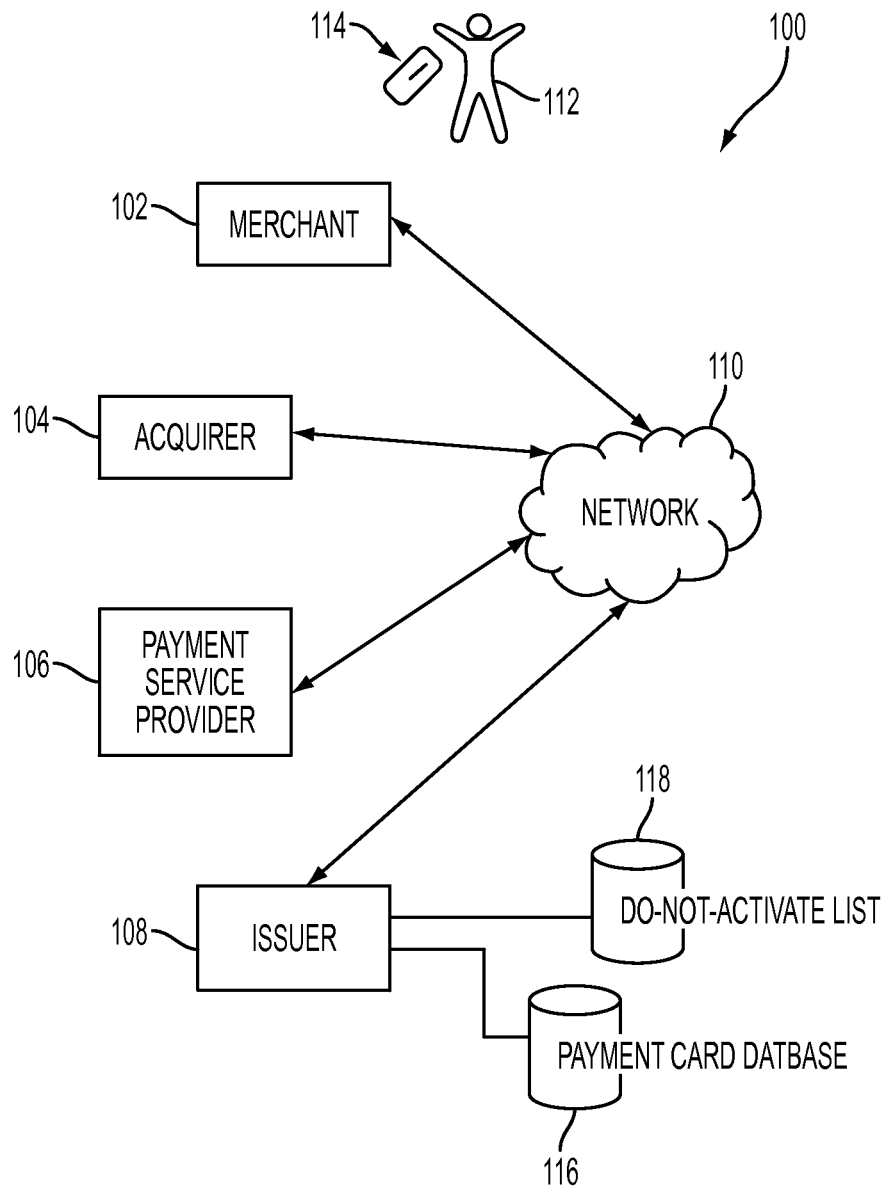
FIG. 1 is a block diagram of an exemplary system of the present disclosure suitable for use in inhibiting theft of payment cards.

FIG. 1 illustrates an exemplary system 100, in which the one or more aspects of the present disclosure may be implemented. Although, in the described embodiment, components of the system 100 are presented in one arrangement, other embodiments may include the same or different components arranged otherwise, depending, for example, on activation processes for payment cards.

The illustrated system 100 includes a merchant 102, an acquirer 104, a payment service provider 106, and an issuer 108, each coupled to network 110. The network 110 may include, without limitation, a local area network (LAN), a wide area network (WAN) (e.g., the Internet, etc.), a mobile network, and/or another suitable public and/or private network capable of supporting communication among two or more of the components illustrated in FIG. 1, or even combinations thereof. Generally, in this example, at least two networks are included in the network 110, a public network is coupled between the merchant 102 and the acquirer 104, while a private payment network is coupled between the acquirer 104, the payment service provider 106, and the issuer 108.

The illustrated system 100 further includes a consumer 112, which is described herein as interacting with the merchant 102 to purchase a payment card 114. The payment card 114 may include, for example, a gift card, an insurance disbursement card, a benefits card, a travel card, a payroll card, a tax refund card, or another card, in which funds are loaded to a payment card. The payment card 114 generally includes any payment card, which is not distributed directly from the issuer 108 to the consumer 112, but is instead distributed through an inventory process (e.g., the merchant 102). The payment card 114 may be issued by the merchant 102 or, as in this particular embodiment, the issuer 108 and then offered for sale by the merchant 102.

As used herein, the term issuer should be understood to be inclusive of the issuer 108 and any entity associated with or retained by the issuer 108 to perform one or more processes described herein. The issuer 108 further may be a compilation of multiple sub-parts related to payment cards and transactions thereto. The issuer 108 may include, for example, a sub-part to manage a payment card database (as described below), a sub-part to process payment card transactions, and a sub-part to detect and/or combat instances or fraud, etc. Different sub-parts may be optimized for speed, availability, large data storage, etc., while interacting with one another, and sharing information described herein (e.g., the payment card database, do-not-activate list, etc.)

Figure 4:
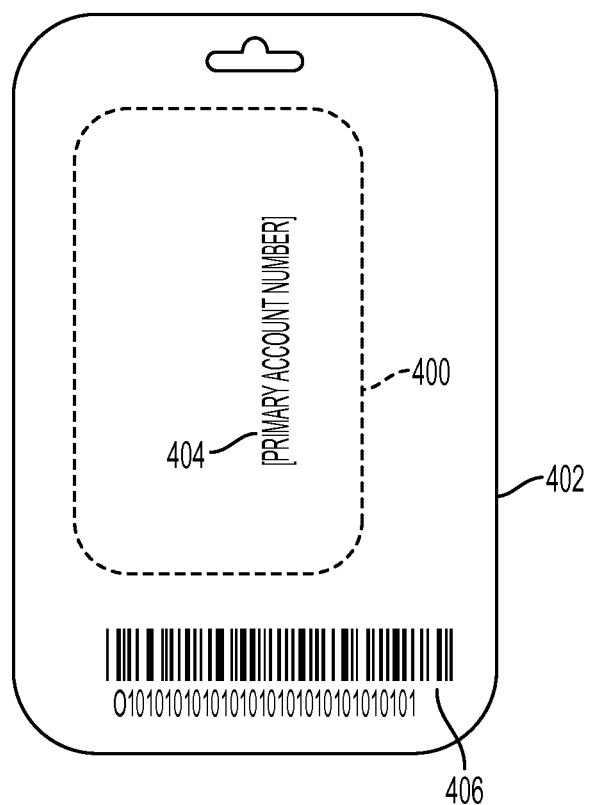
FIG. 4 is an exemplary payment card, enclosed within a package.

The payment card 114 is identified by a primary account number (PAN), but is not identified with a particular consumer. The PAN may be a 16-digit PAN (similar to a traditional credit or debit card), or any of a variety of different formats. The payment card 114 is further sold within packaging (as shown in FIG. 4, described below), which obscures at least a portion of the PAN of the payment card 114. The packaging includes an identifier, which may be used to activate the payment card 114, during purchase at the merchant 102, also as described in more detail below. The identifier may include at least a portion of the PAN, or may be entirely different therefrom. In at least one embodiment, the identifier is an encrypted version of at least a portion of the PAN.

The payment card 114 is generally inactive prior to purchase from the merchant 102. The payment card 114 may be activated at a point of sale (POS) associated with the merchant 102, or alternatively, may be activated by calling an activation phone number or visiting a website associated with the issuer 108, etc.

For example, when the consumer 112 tries to purchase the payment card 114, the merchant 102 swipes or otherwise reads the payment card 114, at the POS. The merchant 102 (and in particular, the POS) then transmits an activation request for the payment card 114 to the payment network, to the acquirer 104, and through the payment service provider 106 to the issuer 108. It is the issuer 108, in this embodiment, who activates the payment card 114, and a payment account associated therewith is maintained by the issuer 108. The activation request includes the identifier associated with the payment card 114. A separate request is then transmitted to load funds onto the payment card 114. In some embodiments, rather than separate load and activation requests, the request to load funds to the payment card 114 may constitute an activation request for the card. The issuer 108 may further require verification that the merchant 102 has received payment for the card 114 (i.e., a balance of the card and, in some examples, an activation fee), prior to activating and loading the card 114 with a particular amount. Depending on the type of card, the amount of funds on the payment card 114 may be predetermined or fixed (e.g., gift cards in denominations of $25, $50, $100, etc.), or the consumer 112 may be able to decide the amount of funds to load to the card 114. The payment for the card 114 may be sent directly to the issuer 108 after purchase, or may be settled at a later time.

Once the payment card 114 has been activated, the issuer 108 designates the payment card 114 as active and ready for purchase. The payment card 114 may be used in the same or similar manner as a credit or debit card at one or more merchants 102 (depending on the type of payment card), either at merchant locations or via merchant websites, etc. As the payment card 114 is used, the issuer 108 keeps track of the remaining funds in the payment account associated with the card 114, and reduces the funds after each payment transaction until no funds remain in the account. In addition to a purchase (or a return), a variety of other non-activation interactions between the issuer 108 and the consumer 112 (through the payment network, or directly) may be associated with use or maintenance of the payment card 114. For example, the consumer 112 may be permitted to check the balance of the remaining funds by a balance inquiry, via a website or telephone number associated with the issuer 108. In another example, the issuer 108 may offer a consumer services hotline to address questions from the consumer 112 about use of the payment card 114.

With further reference to FIG. 1, the issuer 108 is associated with databases stored in memory: a payment card database 116 and a do-not-activate list 118. The payment card database 116 includes certain information about multiple payment cards issued by the issuer 108. Such information includes, for example, account numbers, PANs, identifiers, available funds, transactions histories, and/or other information suitable for use in managing the payment cards, etc. The do-not-activate list 118 includes a list of payment cards that should not be activated by the issuer 108, for a variety of reasons, including, for example, potential theft (as described below). While the databases are illustrated as separate in FIG. 1, it should be appreciated that the databases may be integrated, such that, for example, information relevant to a particular payment card 114 is stored in one database. In such an example, the do-not-activate list 118 is a status associated with each payment card in the payment card database 116, which is set to indicate the card is designated "do not activate."

Figure 2:
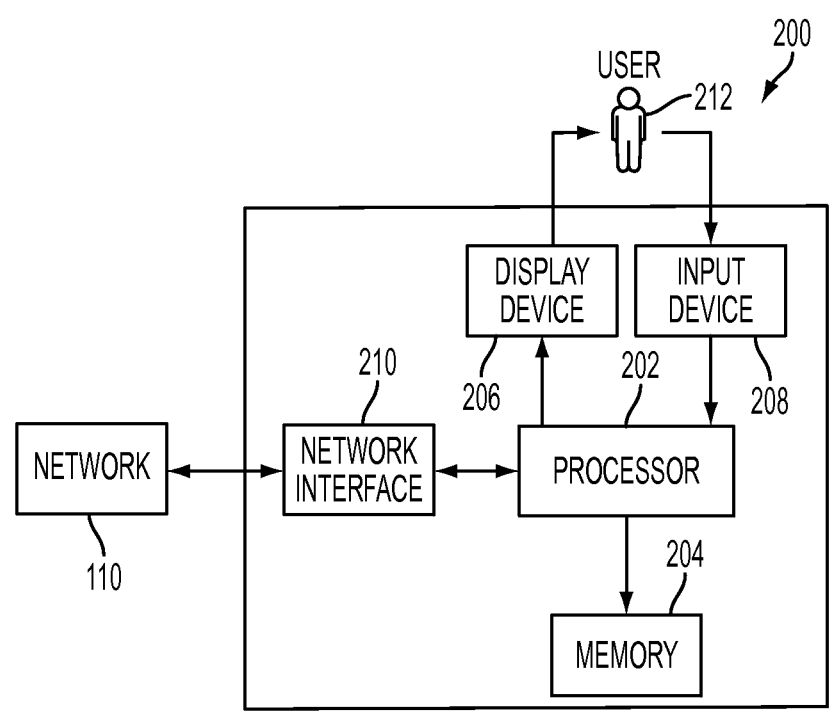
FIG. 2 is a block diagram of a computing device that may be used in the exemplary system of FIG. 1.

Each of the merchant 102, the acquirer 104, the payment service provider 106, and the issuer 108 (and sub-parts thereof) may be implemented in any one or more computing devices. For illustration, the system 100 is further described below with reference to an exemplary computing device 200 illustrated in FIG. 2. The system 100, and the components therein, however, should not be considered to be limited to the computing device 200, as different computing devices, number of computing devices, and/or arrangements of computing devices (located together, or distributed across a geographic region) may be used in other embodiments.

The computing device 200 may include, for example, one or more servers, workstations, personal computers, laptops, tablets, PDAs, point of sales terminals, card reader devices, smartphones, etc.

The exemplary computing device 200 includes a processor 202 and a memory 204 coupled to the processor 202. The processor 202 may include, without limitation, a central processing unit (CPU), a microprocessor, a microcontroller, a programmable gate array, an ASIC, a logic device, or the like. The memory 204 is a computer readable media, which includes, without limitation, random access memory (RAM), a solid state disk, a hard disk, compact disc read only memory (CD-ROM), erasable programmable read only memory (EPROM), tape, flash drive, and/or any other type of volatile or nonvolatile physical or tangible computer-readable media. Memory 204 may be configured to store, without limitation, a payment card database, do-not-activate list, and/or other types of data suitable for use as described herein.

In the exemplary embodiment, computing device 200 includes a display device 206 that is coupled to the processor 202. Display device 206 outputs to a user 212 by, for example, displaying and/or otherwise outputting information such as, but not limited to, pages, applications, do-not-activate reports, payment card account information, payment card transactions, payment card activation status, and/or any other type of data. For example, display device 206 may include, without limitation, a cathode ray tube (CRT), a liquid crystal display (LCD), a light-emitting diode (LED) display, an organic LED (OLED) display, and/or an "electronic ink" display. In some embodiments, display device 206 includes multiple devices. It should be further appreciated that various interfaces (e.g., graphic user interfaces (GUI), or webpages, etc.) may be displayed at computing device 200, and in particular at display device 206, to initiate, solicit, and/or complete payment card transactions and/or activations, etc.

The computing device 200 also includes an input device 208 that receives input from the user 212, such as the merchant 102, for example. The input device 208 is coupled to the processor 202 and may include, for example, a keyboard, a pointing device, a mouse, a stylus, a touch sensitive panel (e.g., a touch pad or a touch screen, etc.), and/or an audio input device. In some example embodiments, the input device 208 may include a card reader, swipe reader, etc., and/or any other device suitable for obtaining payment card information from a payment device. Further, in various exemplary embodiments, a touch screen, such as that included in a tablet, a smartphone, or similar device, behaves as both display device 206 and input device 208.

The computing device 200 further includes a network interface 210 coupled to the processor 202. The network interface 210 may include, without limitation, a wired network adapter, a wireless network adapter, a mobile telecommunications adapter, or other device capable of communicating to one or more different networks, including network 110.

Figure 3:
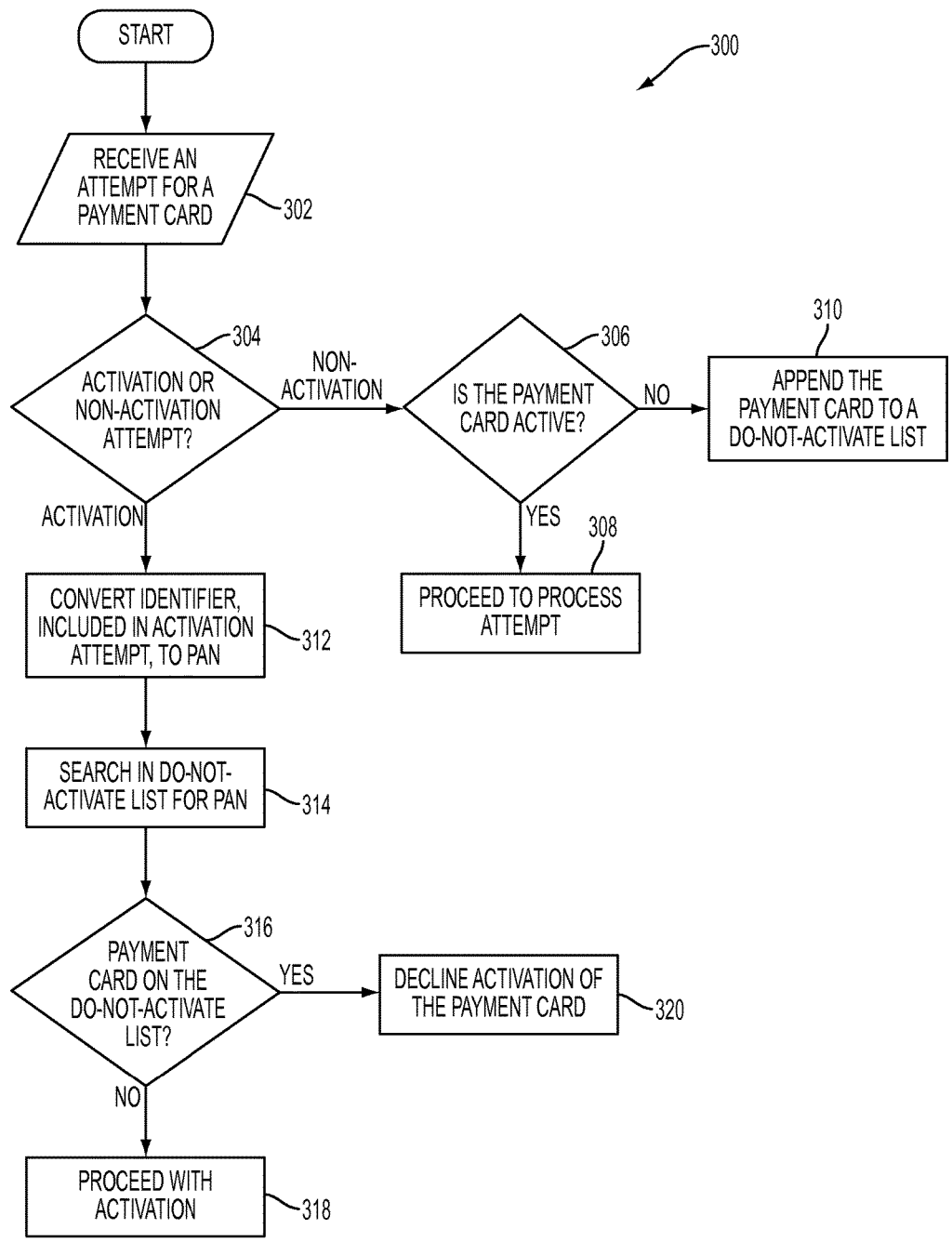
FIG. 3 is an exemplary method for inhibiting theft of payment cards.

FIG. 3 illustrates an exemplary method 300 of inhibiting theft of payment cards. The exemplary method 300 is described as implemented in the issuer 108, and in particular, the issuer computing device 200, although in other embodiments some or all of the methods may be implemented in other portions of the system 100, such as, for example, the merchant 102, etc. Method 300 is further described with reference to the merchant 102, the issuer 108, and the consumer 112. It should be appreciated that the methods described herein are not limited to the system 100, or computing device 200. And, conversely, the systems and computing devices described herein are not limited to the exemplary method 300.

The method is further described with reference to the payment card 400, illustrated in FIG. 4. As shown, the payment card 400 (indicated by the dotted lines) is enclosed within a package 402. The payment card 400 may include any different type of payment account device, including a card (as in this embodiment), a fob, or another readable device suitable to relay payment account information to enable transaction thereto. As shown, the package 402 obscures the account number associated with the payment card 400 (e.g., the PAN 404, etc.), but includes an identifier 406 for the payment card 400. While illustrated as a barcode and number, the identifier 406 may be any type of number or symbol, which may be scanned or otherwise read by the merchant 102, and more often, the input device 208 of the merchant computing device 200. It should be understood that the methods and systems herein are not limited to the payment card 400 (or package 402) illustrated in FIG. 4, as others may be used in other embodiments.

Referring again to FIG. 3, the issuer 108 receives an attempt related to the payment card 400, at 302. The issuer 108 determines, at 304, whether the attempt is an activation attempt or a non-activation attempt. As should be apparent, an activation attempt is a communication, originating at the merchant 102 selling the payment card 400, to activate the payment card 400 and/or fund the payment card 400. Alternatively, or in addition, the activation attempt may further include a communication through a phone number associated with the issuer 108, a website associated with the issuer 108, etc. Conversely, a non-activation attempt may include any attempt related to the payment card 400 other than an activation attempt. Non-activation attempts may include, for example, attempts to make a purchase, check the balance of the payment card, customer service call, etc. If the attempt is a non-activation attempt, the issuer 108 determines if the payment card is active, at 306. The issuer 108, for example, may look up the payment card 400 in the payment card database 116 (for example, by the PAN 404 included in the non-activation attempt) to determine if the card 400 is active. If the card 400 is active, the issuer 108 proceeds to process the requested attempt, at 308. For example, the issuer 108 may provide a balance, in response to a balance inquiry, or in another example, complete a purchase to the payment card 400, in response to an attempt to purchase and reduce the funds associated with the card by the purchaser price.

Conversely, when the payment card 400 is not active, the issuer 108 appends, at 310, the payment card 400 to the do-not-activate list 118, which is stored in memory 204. The information about the payment card 400, stored in the do-not-activate list 118, may be any information sufficient to identify the payment card 400 (as described below). For example, either or both of the PAN and the identifier may be stored in the do-not-activate list 118 for each payment card on the list.

If the attempt is an activation attempt, it will generally originate from the merchant 102, or from the consumer 112 through a website or phone number associated with the issuer 108. The activation attempt may include, for example, an attempt to strictly activate the payment card 400, or an attempt to activate and load funds onto the payment card 400. In one example, when the payment card 400 is sold by the merchant 102, the payment card 400 is often enclosed (at least partially) in the package 402, such that the activation attempt includes the identifier 406 on the package 402, rather than the PAN 404. Thus, when the attempt is an activation attempt at 304, the issuer 108 receives the activation attempt for the payment card 400, including the identifier 406. The issuer 108 converts the identifier 406 to the PAN, at 312. The memory 204 of the issuer computing device 200 includes the payment card database 116, with each payment card having an entry therein. For the payment card 400, the entry denotes the payment account associated with the payment card 400 and includes, for example, the PAN 404 of the card, the identifier 406 of the card, etc. To convert the identifier to the PAN 404, the issuer 108 searches for the identifier 406 in the database to identify the PAN 404 for the payment card 400. After identifying the PAN 404 (in this embodiment), or other information indicative of the payment card 400, the issuer 108 searches the do-not-activate list 118 for the payment card 400, at 314.

It should be understood that the do-not-activate list 118 may include the PAN, the identifier, and/or other payment card specific information in other embodiments. In such embodiments, the issuer 108 may search for either or both of the PAN and identifier (or other information) upon an attempt to activate the payment cards, depending on the format by which the payment cards are indicated in the list 118.

If the payment card 400, and in particular the PAN 404, is not included in the do-not-activate list 118 at 316, the issuer 108 proceeds to activate the payment card 400, at 318, in accordance with known processes. Alternatively, if the payment card 400 is included in the do-not-activate list 118, the issuer 108 declines activation of the payment card 400, at 320. The merchant 102, in turn, receives the decline. At that point, the merchant 102 may attempt to activate a different payment card, or conclude the transaction with the consumer 112. The declined payment card may be disposed of by the merchant 102, or returned to the issuer 108 or some intermediary.

The above methods may be repeated for a variety of different merchants and a variety of different payment cards. Generally, after a certain period of time, the payment cards may be removed from the do-not-activate list, so that a subsequent payment card may be issued with the same PAN, or identifier. Specifically, when a thief steals a payment card from within packaging at a merchant, he/she may attempt to determine if the card becomes active for a few days, a week, or even a month. After which, the thief may dispose of the card. Accordingly, certain payment cards may be purged from the do-not-activate list after a predetermined period, such as 1 month, 2 months, 6 months or a year, etc., after no further non-activation attempts are received.

Further, payment cards may be appended to the do-not-activate list each time a non-activation attempt is received for a payment card prior to activation, so that the do-not-activate list is updated continuously. Alternatively, in certain embodiments, payment card information may be appended to the do-not activate list periodically (e.g., daily, weekly, etc.). A continuously updated do-not-activate list may be searched by an issuer, or the issuer may search periodic reports (e.g., daily, weekly, etc.) generated from the do-not-activate list. Moreover, the do-not-activate list may be circulated or shared within the issuer (to its sub-parts, for example) or elsewhere. For example, the issuer may compile updates or reports of the do-not-activate list, which may be analyzed by the issuer, and/or shared with merchants, particularly those merchants in locations where fraud in the manner described herein occurs frequently. Such reports may include, without limitation, an amount and/or frequency of fraud in specific locations, an amount and/or frequency of fraud of specific card types, an amount and/or frequency of fraud during specific time periods, etc.

It should be appreciated that the methods and systems herein inhibit a thief from using a payment card, when he/she removes the payment card from its package or otherwise capturing payment card information from the card, which has yet to be sold by a merchant and/or activated by a consumer. In this manner, to the extent the thief is able to steal the payment card, or otherwise capture payment card information, the thief is unable to attempt a purchase with the card, check the status of the card, etc., without risking having the card flagged for potential theft. Once flagged, the card will not be eligible to be activated, and the thief will thus be unable to steal funds therefrom.

It should be appreciated that the functions described herein, in some embodiments, may be described in computer-executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving, at a computing device, a non-activation attempt for a payment card, the payment card having a primary account number (PAN), the non-activation attempt including the PAN, (b) when the non-activation attempt precedes an activation attempt for the payment card, appending, at the computing device, the payment card to a do-not-activate list stored in memory, (c) receiving, at the computing device, the activation attempt from the merchant, via a payment network, the activation attempt including an identifier associated with the payment card, wherein the identifier is different than the PAN, and (d) in response to an activation attempt, declining, by the computing device, activation of the payment card when the payment card is included in the do-not-activate list.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method of inhibiting theft of payment cards, the method comprising:

receiving, at at least one server, a non-activation attempt for a payment card having a primary account number (PAN), the non-activation attempt including the PAN;

when the non-activation attempt precedes an activation attempt for the payment card, appending, at the at least one server, the payment card to a do-not-activate list stored in memory, thereby relying on the non-activation attempt as an indication of theft of the payment card;

receiving, at the at least one server, an activation attempt from a merchant offering the payment card for sale, via a payment network, the activation attempt including an identifier associated with the payment card, wherein the identifier is different than the PAN; and in response to the activation attempt, declining, by the at least one server, activation of the payment card when the payment card is included in the do-not-activate list, thereby inhibiting funds from being loaded to the payment card.

2. The method of claim 1, wherein the payment card is one of a gift card, a prepaid card, an insurance disbursement card, a benefits card, a travel card, a payroll card, and a tax refund card.

3. The method of claim 2, wherein the non-activation attempt includes one of a purchase attempt, a balance inquiry attempt, and a customer service call.

4. The method of claim 3, further comprising identifying, at the at least one server, the PAN for the payment card based on the identifier; and determining whether the PAN is included in the do-not-activate list stored in the memory.

5. The method of claim 1, further comprising identifying, at the at least one server, the PAN for the payment card based on the identifier; and determining whether the PAN is included in the do-not-activate list stored in the memory.

6. The method of claim 5, wherein receiving the activation attempt includes receiving a request to load funds to the payment card.

7. The method of claim 1, further comprising, in response to the activation attempt, activating, by the at least one server, the payment card when the payment card is not included in the do-not-activate list.

8. The method of claim 1, further comprising purging, by the at least one server, the payment card from the do-not-activate list after a predetermined period.

9. A system for use in inhibiting theft of payment cards, the system comprising:

at least one server having a processor and a memory coupled to the processor, the memory including a payment card database and a do-not-activate list, the payment card database including multiple payment accounts, each of said payment accounts associated with a payment card;

wherein the memory includes instructions executable by the processor to cause the processor to:

for a non-activation attempt associated with a payment card, and wherein the payment card is associated with a first payment account of the multiple payment accounts:

determine whether the non-activation attempt precedes activation of the payment card in the payment card database; and append the payment card to the do-not-activate list in the memory when the non-activation attempt precedes activation of the payment card;

for an activation attempt of the payment card associated with the first payment account:

search in the do-not-activate list for the payment card; and when the payment card is included in the do-not-activate list, decline activation of the payment card, thereby inhibiting funds from being loaded to the payment card associated with the first payment account.

10. The system of claim 9, wherein each of said multiple payment accounts has a primary account number (PAN);

wherein the activation attempt includes an identifier for the payment card, the identifier being different than the PAN of the first payment account associated with the payment card; and wherein the instructions are executable by the processor to cause the processor to convert the identifier to the PAN and search in the do-not-activate list for the payment card based on the PAN of the first payment account.

11. The system of claim 9, wherein the non-activation attempt includes one of a purchase attempt, a balance inquiry attempt, and a customer service call.

12. The system of claim 9, wherein the do-not-activate list includes, for each payment card on the do-not-activate list, a primary account number (PAN) and/or an identifier associated with said payment card.

13. The system of claim 9, wherein the payment card associated with the first payment account is one of a gift card and a prepaid card.

14. The system of claim 9, wherein the payment card associated with the first payment account is one of an insurance disbursement card, a benefits card, a travel card, a payroll card, and a tax refund card.

15. The system of claim 9, wherein the activation attempt includes a request to load funds to the payment card.

16. The system of claim 9, further comprising the payment card associated with the first payment account at least partially enclosed in a package, the payment card including a primary account number (PAN) for the first payment account associated with the payment card, the package including an identifier for the payment card and structured to obscure at least part of the PAN on the payment card from view.

17. The system of claim 16, wherein the activation attempt for the payment card includes the identifier for the payment card, the identifier being different than the PAN for the first payment account associated with the payment card; and wherein the instructions are executable by the processor to cause the processor to convert the identifier to the PAN and search for the PAN in the do-not-activate list, in order to search in the do-not-activate list.

18. The method of claim 1, further comprising distributing the payment card to the merchant, where the payment card is at least partially enclosed in a package, the package including an identifier for the payment card and structured to obscure at least part of the PAN on the payment card from view.

19. A system for use in inhibiting theft of payment cards, the system comprising:

a payment card associated with a payment account and including a primary account number (PAN) for the payment account, the payment card at least partially enclosed in a package having an identifier for the payment card and structured to obscure at least part of the PAN on the payment card from view, the identifier being different than the PAN; and at least one processor configured to:
- receive a non-activation attempt for the payment card, the non-activation attempt including the PAN of the payment card;
- when the non-activation attempt precedes an activation attempt for the payment card, append the payment card to a do-not-activate list stored in memory in communication with the at least one processor, thereby relying on the non-activation attempt as an indication of theft of the payment card;
- receive an activation attempt from a merchant offering the payment card for sale, via a payment network, the activation attempt including the identifier associated with the payment card; and
- in response to the activation attempt, decline activation of the payment card when the payment card is included in the do-not-activate list, thereby inhibiting funds from being loaded to the payment card.

20. The system of claim 19, wherein the at least one processor is further configured to:
- identify the PAN for the payment card based on the identifier of the payment card received from the merchant in connection with the activation attempt, and determine whether the payment card is included in the do-not-activate list stored in the memory based on the PAN; and
- when the payment card is not included in the do-not-activate list, activate the payment card in response to the activation attempt.

* * * * *